Dec. 27, 1966  M. F. BAUER  3,294,359
VALVE SWIVEL FITTING FOR COOLANT SYSTEMS
Filed July 6, 1965

INVENTOR.
MATTHEW F. BAUER
BY Ely, Gabrick & Flynn
ATTORNEYS

United States Patent Office 3,294,359
Patented Dec. 27, 1966

3,294,359
VALVE SWIVEL FITTING FOR
COOLANT SYSTEMS
Matthew F. Bauer, 16129 Northvale,
East Cleveland, Ohio 44112
Filed July 6, 1965, Ser. No. 469,827
8 Claims. (Cl. 251—148)

The present invention relates to a swivel fitting and more specifically to a swivel fitting adapted to be used in coolant systems for machine tools. This application is a continuation-in-part of application Serial No. 219,625, of August 27, 1962, and now abandoned.

Generally, a coolant or cutting liquid is used on metal cutting machines, such as turret lathes, milling machines, grinders, etc., or others where the friction between the cutting tool and the workpiece is such that the heat produced would damage the tool or workpiece if not cooled. On production machines, such as turret lathes, the coolant spout or nozzle directing the coolant on the tool and workpiece is constantly being repositioned and this tends to break down the swivel connections whereby the spout is adjustably mounted to the point that the spout shifts under its own weight, causing it to droop. On some machines, the coolant pipe lines are connected together by pipe threads or ball sockets used as swivel joints, but as a result of constant repositioning of the coolant spout these pipe threads or ball sockets wear loose, also causing leakage in the coolant systems. The extra time taken by the operator to hold the spout in place or to fix a leak is wasted motion and this is directly related to an increase in operator fatigue and a decrease in production. Also in certain prior arrangements, where the swivel system is tight enough for the adjusted position of the spout to be self-maintained or for non-leakage, precise adjustment on initial work set up or subsequently may be difficult because under normally applied force, the spout starts somewhat suddenly and tends to overtravel, as the sliding friction is less than the static or starting friction in the system.

An object of this invention is the provision of a swivel fitting adapted to be used in coolant systems for cutting machines whereby when the swivel fitting is rotated to adjust the coolant spout aim at the region of cutting tool engagement with the work, the force required to first overcome the starting friction for rotating the swivel fitting is not too much greater than or approximately equal to the force required to overcome the sliding friction for continuing the rotation of the swivel fitting; thus, enabling a better control of the manually shifted spout, for stopping at the desired aiming point, without overtravel, while providing a sufficient static friction to prevent the coolant spout from drooping after it is once adjusted.

Another object of this invention is the provision of a swivel fitting in which the pressure seal and the amount of force required to overcome the starting friction are substantially independent of each other, so that the sealing function and the spout position maintaining force are substantially equal to each other.

Another object is the provision of a swivel fitting whose frictional turning force or drag contact is dependent upon a combination of O-ring-to-metal and metal-to-metal frictional contact, and preferably upon a plastic-to-metal contact.

Still another object of this invention is the provision of a swivel fitting to be used in coolant systems for machines whose frictional turning force or drag is dependent upon three areas of contact, namely, a hardened metal surface contacting an equally hard metal surface, a hardened surface contacting a soft surface, and an O-ring contacting a hardened metal surface thereby providing a drag whose starting friction is not too much greater than the sliding friction.

Other objects and a fuller understanding of the invention may be had by referring to the following description and claims, taken in conjunction with the accompanying drawing, in which:

Figure 1:
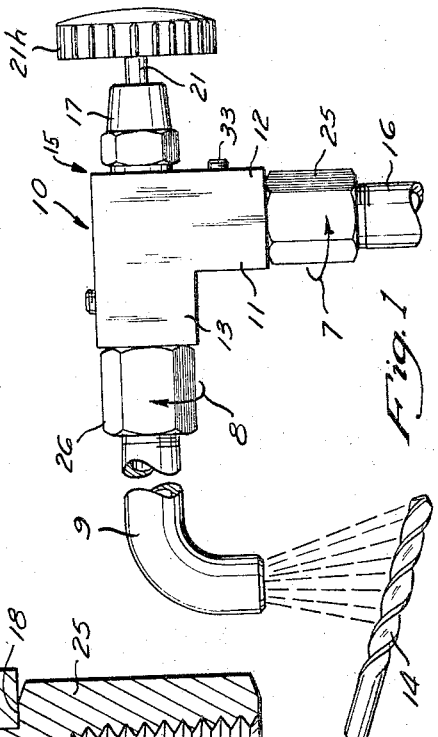
FIG. 1 is a pictorial view of a swivel fitting for coolant systems with a spout attached to one end of the fitting for directing coolant on a cutting tool.

With reference to FIG. 1 the valved swivel fitting 10 of the invention is primarily designed to be incorporated in cutting tool coolant systems for machines, such as turret lathes, automatic screw machines, milling machines, etc. In this illustration, the swivel fitting includes valve means 15 and has one end adapted to be connected to a vertical pipe 16 and the other end adapted to be connected to a coolant spout or nozzle 9. As indicated by the directional arrows 7, 8, 360 degree rotation is possible for the fitting body 11 around the axis of pipe 16 and also for the coolant spout 9 with respect to the body. Thus the operator has a universal range of positions enabling him to direct a coolant on the working region of a cutting tool 14 and also to control the flow by the valve means 15 included therein.

The swivel fitting 10 comprises the fitting body 11 having a first bored branch leg 12 and a second bored branch leg 13 substantially at right angles to each other and each terminating in respective end faces; bores 19 and 20 respectively extending from the annular end faces to intersect and interconnect with each other to provide through the body a fluid passage or connection 30 between the end faces. The body can be considered as having a bored lateral outlet branch 13 on a vertical portion 12, throughbored and threaded at the top end of the bore 19 to receive the male threaded end of an axially bored plug-like valve bonnet 17, in which a valve stem 21, sealed against leakage by an O-ring 22 in an internal groove 17g near the upper end of the bonnet bore, is movable axially in the vertical body bore upon rotation through valve handle 21h by virtue of its threaded end portion 21a engaged in the threaded counter-bore 17b of the bonnet.

The extreme end of the stem 21 is reduced at 21b and slightly end-peened to receive rotatably and retain a hard washer ring 21w with beveled or 45° conical sealing surface, which under axial closing or seating pressures effects a sufficient seal between its radial conical bore face and the radial shoulder between the reduced end threaded portions of the stem.

Figure 2:
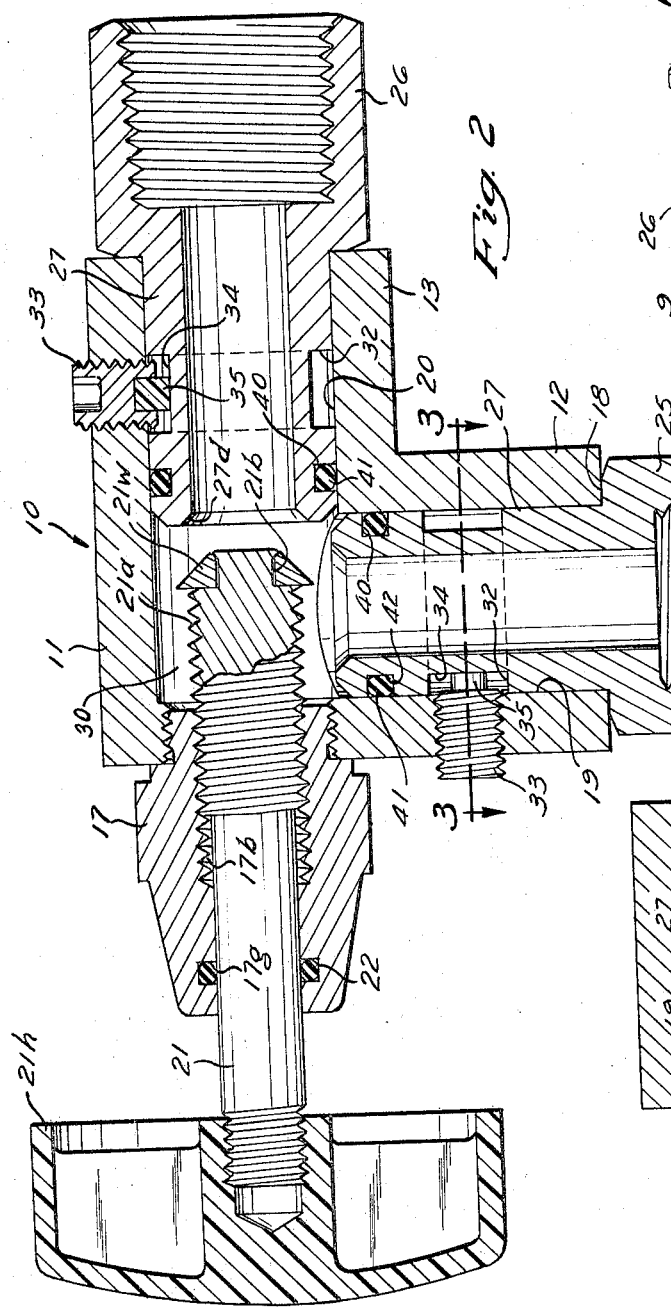
FIG. 2 shows a partially sectioned side view of the swivel fitting.

As illustrated in FIG. 2 by the partially sectional side view of the swivel fitting 10, the branch legs 12 and 13 are provided with identical swivel members 25 and 26, identically pivotally connected to the branch legs 12 and 13, respectively, so that only one swivel member need be described in detail.

The swivel member 25 has an external intermediate stepped shoulder 18 between an external wrench engagement formation thereof and a generally cylindrical stem portion 27 adapted to close fitting insertion in the bore 19, the stem insertion being limited by the abutment of shoulder 18 against the annular end face. The external connection body in addition to wrench flats has female threads adapted to receive the male threaded end of pipe 16, or in the case of swivel 26 of the spout 9.

In the member 26, necessarily coaxially aligned with the valve stem 21 by virtue of the described structure, the inner end affords a valve seat for sealing engagement by the valve stem, specifically by the beveled surface of the valve stem washer engaging the edge area, preferably matingly beveled as at 27d, about the bore of stem 27. The rotational looseness of the stem washer on the stem allows seating without any notable wearing movement on the seating surfaces.

The connection body portion of a swivel member may include any suitable means for connecting the swivel fitting 10 to a coolant system supply line or to the nozzle. For example, where the coolant spout 9 is formed from tubing, it may be connected to the fitting body by means of a swivel member externally male threaded on its outer end to receive a compression nut for a flared tube connection, or any other apt assembly.

The stem portion of a swivel member has first and second grooves 32 and 40, in contrast with the stem in the aforesaid application having a third and outer O-ring groove. The second groove 40 is located between the end of the stem portion and the first groove 32. The depth of both grooves is defined for present purposes as the distance between their respective bottom walls 34 and 42 and the bore wall 19. In the second groove 40 there is an O-ring 41, the cross-sectional diameter of which is greater than the depth of the groove 40 whereby with the stem in the bore thus providing a pressure seal against any objectionable leakage.

A wall of each branch leg has a female threaded aperture therethrough adapted to receive a set screw 33, the first groove 32 and the set screw 33 being so positioned with respect to each other when the end face and the stepped shoulder are in contact with each other, that the set screw 33 will engage the groove 32. The set screw 33 has an outside diameter which is greater than the depth of the groove 32 but less than the diameter of the bottom wall 34. The set screw 33 has a flat end surface 35 which makes a frictional contact with and is softer than the stem metal surface at the bottom wall 34, in contrast with the set screws in the aforesaid application where the set screw or at least its contact end is of softer metal than the stem surface, the set screw here being shown as having a nylon cylindrical plug insert to provide the softer face; giving the set screw a dog-point gross form. As a result of constant use, the flat end surface 35 may wear a little, but the amount of wear is so slight that the set screw 33 may be readjusted to a new position and still practically maintain the original frictional contact.

Figure 3:
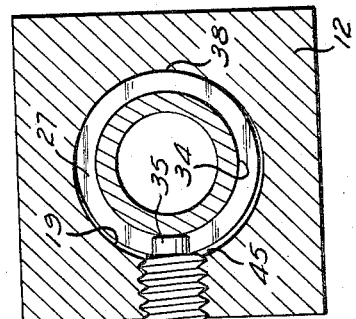
FIG. 3 is an illustration of a cross-sectional view taken along the line 3—3 of the stem portion and the bore wall.

As can be best seen illustrated in FIG. 3, a cross-section at line 3—3 of FIG. 2, when the set screw 33 is tightened down, the stem portion 27 is forced to one side, forming a frictional metal contact 38 with the wall of the bore 19, and on the opposite side leaving a clearance 45 between the bore wall 19 and the stem portion 27; the clearance being quite exaggerated, since actually only a few thousandths of an inch.

The set screw engagements retain members 25, 26 of course against axial displacement and escape from the fitting body bores under the usually moderate coolant supply pressures, and further member 26 against the valve seating and sealing forces applied by the screwed-in valve stem 21.

The total drag friction between the stem portion 27 and the wall of bore 19 is a combination of three different frictional drag means, whereby the torque required to turn the stem portion 27 may be made approximately equal to the amount of torque required to keep the stem portion 27 rotating. In other words, the starting friction is substantially equal to the sliding friction, a desirable feature for reasons above stated.

The first drag means is a result of the set screw 33 contacting the bottom wall 34 of the first groove; and the second, the frictional metal contact at 38. The area of greatest frictional contact at 38 is directly opposite the set screw with a gradually diminishing distribution of the friction on each side as the force components normal to the cylindrical surfaces diminish. The increase in the amount of friction between the set screw 33 and the bottom wall 34 is for practical purposes directly proportional to the increase in the amount of friction at the metal contact at 38 once the latter contact is established, since both are dependent upon the normal forces applied, therefore upon the degree in which the set screw is turned down. As stated, the set screw 33 or at least its tip preferably is made of soft metal or a plastic such as nylon, whereas the stems 27 and bore walls have hardened surfaces, both for wear resistance and frictional character of the engaging surfaces. The third drag means includes the second groove 40 with O-ring 41 mounted therein to frictionally engage both the bore and groove walls.

As illustrated in FIG. 2, the portion of the second groove 40 opposite the set screw 33 has a groove depth in the sense above defined which is less than the depth of the portion of the groove on the same side as the set screw 33, so that the drag friction caused by the O-ring 41 is the greatest on the side opposite the set screw 33 with a gradual diminishing distribution of the friction on each side.

The first drag friction caused by the friction of a soft metal or plastic of the set screw contacting a hardened surface, the second drag friction caused by two hardened steel or other metal surfaces contacting each other, and the third drag friction caused by a rubber-like O-ring contacting a hardened surface, are individually different, but as combined in the fitting all three tend to substantially equalize the starting and sliding friction.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

I claim:

1. A swivel fitting for piping systems comprising a fitting body having first and second bores extending inwardly respectively from first and second end faces of the body, said bores having axes angularly disposed to each other and intersecting said bores each having a hard surfaced bore wall, said bores being interconnected with each other and constituting a fluid connection between said end faces, a swivel member pivotally connected at each of said end faces, said swivel members each having an external intermediate stepped shoulder in confronting relationship to the respective end face, a stem portion extending in one direction from said stepped shoulder and rotatably received in the respective bore with a close fit therein, and a threaded connection portion extending in the opposite direction from said stepped shoulder, said threaded connection portion being adapted for connection in a piping system, said stem portion of each swivel member having a hardened external surface in confronting relationship to the respective bore wall, said swivel members each having a fluid passageway extending therethrough and communicating with said bores, means for establishing a drag friction between each stem portion of the swivel member and the fitting body for substantially equalizing the starting and sliding friction upon relative rotation between them, said means comprising at least a first, second and third drag friction means including a first external groove in said stem portion having a hard surfaced bottom wall and a set screw threadably extending through a portion of said body substantially radially into the respective bore and registering with said first groove, said set screw having an inner end softer than and bearing against the surface of said bottom wall to produce a first friction drag, said set screw having an outside diameter less than the width of the groove bottom wall, said set screw forcing said stem end portion of the swivel member laterally within said bore a distance sufficient to position the hard outside surface of said stem portion in frictional engagement with the hard-surfaced bore wall at a location directly opposite the set screw and with gradually diminishing frictional engagement therewith circumferentially on each side of said location, whereby to provide said drag friction means, said third drag friction means including a second external groove in said stem portion and a deformable resilient O-ring mounted therein, said second groove being located between the inner end of said stem portion and said first groove and having a bottom wall defining a depth with respect to said bore wall less than the cross-sectional diameter of said O-ring thereby compressing the O-ring between the bottom of the second groove and said bore wall over its entire circumference to produce an O-ring drag friction upon rotation of said stem portion in said bore, said O-ring drag friction being of the greatest directly opposite said set screw with a gradual diminishing distribution of the friction on each side thereof, said first, second and third drag friction means each producing a different type of drag and all combining to substantially equalize the starting and sliding friction.

2. A fitting as described in claim 1 wherein the set screw has a nylon plug insert to provide said soft end portion.

3. A swivel fitting as described in claim 1 and including a said second bore having a threaded bore extension beyond the first bore and opening through another end face of the body, a bonnet threaded into said extension from the last said end face and having a bore aligned with the said second bore, the inner end portion of a swivel stem portion in the said second bore having a valve seat formation about the passageway opening therethrough, the bonnet bore having one end portion of its length female-threaded and a second end portion smooth and provided with an O-ring receiving groove, an O-ring in the last said groove, a valve stem member having a male-threaded portion engaged with the female thread of the bonnet and a smooth portion circumferentially slidable and rotatably sealed to the bonnet by the last said O-ring, said valve stem member having an outer end projecting through said bonnet and provided with a valve handle and having an inner end provided with a seat formation adapted to engage against the corresponding said seat formation on the said inner end of the swivel stem portion on the said second bore.

4. A valved swivel fitting as described in claim 3 wherein said inner end of the valve stem member is reduced through a radial shoulder and bears a hard metal washer rotationally free thereon with a slight radial play, said washer having a flat back surface engageable with said radial shoulder for pressure sealing thereon and a beveled front face, said seat formation on the cooperating swivel stem formation comprising a complementary narrower bevel at the end of the passageway therethrough.

5. A fitting as described in claim 4 wherein said first and second bores are of like diameter and at right angles to each other, and said swivel members have like stem portions.

6. A swivel fitting for coolant systems comprising a fitting body having first and second branch legs positioned substantially at right angles with respect to each other, said first and second branch legs having respectively first and second annular terminating end faces and respective bores extending inwardly from said faces, said bores of said first and second branch legs being interconnected with each other and constituting a fluid connection between said end faces, each said bore having a hard-surfaced bore wall, a swivel member pivotally connected to each of said branch legs, said swivel members each having an external intermediate shoulder in confronting relationship to the respective end face, a stem portion extending in one direction from said stepped shoulder and rotatably received in the respective bore with a close fit therein, and a threaded connection portion extending in the opposite direction from said stepped shoulder, said threaded connection portion being adapted for connection in a coolant system, said stem portion of each swivel member having a hardened external surface in confronting relationship to the respective bore wall, said swivel members each having an axial fluid passageway extending therethrough and communicating with said bores, means for establishing a drag friction between each stem portion of the swivel members and the fitting body for substantially equalizing the starting and sliding friction upon relative rotation between them, said means comprising at least a first, second and third drag friction means including a first external groove in said stem portion and a set screw associated therewith, said set screw threadably extending through the respective branch leg substantially radially into said bore and registering with said groove, said first groove having a hard surfaced bottom wall, said set screw having an inner end softer than and bearing against said bottom wall of the said groove to produce a first friction drag, said set screw having an outside diameter less than the diameter of the bottom wall of said first groove and having a flat inner end surface whereby said set screw may be readjusted to a new position when it slightly wears and still maintain about the same amount of drag, said set screw forcing said stem end portion of the swivel member laterally within said bore a sufficient distance to position the hard outside surface of said stem portion in frictional engagement with the hard-surfaced bore wall at a location directly opposite the set screw and with gradually diminishing frictional engagement therewith circumferentially on each side of said location, whereby to provide said second drag friction means, said third drag friction means including a second external groove in said stem portion and a deformable resilient O-ring mounted therein, said second groove being located between the end of said stem portion and said first groove and having a bottom wall defining a depth with respect to said bore wall less than the cross-sectional diameter of said O-ring thereby circumferentially compressing said O-ring between the bottom of said second groove and said bore wall to produce an O-ring drag friction upon rotation of said stem portion in said bore, said O-ring drag friction being the greatest directly opposite said set screw with a gradual diminishing distribution of the friction on each side thereof, said first, second and third drag friction means each producing a different type of drag action and all combining to substantially equalize the starting and sliding friction.

7. A swivel fitting for coolant systems comprising a fitting body having a terminating end face and a bore extending inwardly from said end face, said bore having a hard-surfaced bore wall, a swivel member pivotally connected to said fitting body, said swivel member having an external intermediate stepped shoulder in confronting relationship to said end face, a stem portion extending in one direction from said stepped shoulder and rotatably received in said bore with a close fit therein, and a threaded connection portion extending in an opposite direction from said stepped shoulder, said threaded connection portion being adapted for connection in a coolant system, said stem portion of the swivel member having a hardened external surface in confronting relationship to said bore wall, said swivel member having a fluid passageway extending therethrough and communicating with said bore, means for establishing a drag friction between said stem portion of the swivel member and said fitting body for substantially equalizing the starting and sliding friction upon relative rotation between the swivel member and the fitting body, said means comprising at least a first, second and third drag friction means including a first external groove in said stem portion and a set screw threadably extending through said fitting body substantially radially into said bore and registering with said groove, said groove having a hard surfaced bottom wall, said set screw having its inner end bearing against and softer than said bottom wall of the said groove to produce a first friction drag; said set screw having an outside diameter less than the diameter of the groove bottom wall, said set screw forcing said stem portion of the swivel member laterally within said bore a sufficient distance to position the hard outside surface of said stem portion to frictional engagement with the hard-surfaced bore wall at a location directly opposite the set screw and with gradually diminishing frictional engagement therewith circumferentially on each side of said location, whereby to provide said second drag friction means, said third drag friction means including a second external groove in said stem portion and a deformable resilient O-ring mounted therein, said second groove being located between the inner end of said stem portion and said first groove and having a bottom wall defining a depth with respect to said bore wall less than the cross-sectional diameter of said O-ring thereby compressing the O-ring circumferentially between the bottom of said second groove and the bore wall to produce an O-ring drag friction being the greatest directly opposite said set screw with a gradual diminishing distribution of the friction on each side thereof, said first, second and third drag friction means each producing a different type of drag and all combining to substantially equalize the starting and sliding friction.

8. A swivel fitting for coolant systems comprising a fitting body having first and second branch legs positioned substantially at right angles with respect to each other, said first and second branch legs having respectively first and second terminating end faces and respective bores extending inwardly from said faces, said bores of said first and second branch legs intersecting with each other to form a fluid connection between said end faces, said second bore having a threaded bore extension beyond the intersection with the first bore and opening through the body on a side opposite said second end face, a swivel member pivotally connected to each of said branch legs, said swivel members each having an external intermediate stepped shoulder in confronting relationship to the respective end face, a stem portion extending in one direction from said stepped shoulder and rotatably received in the respective bore with a close fit therein, and a threaded connection portion extending in the opposite direction from said stepped shoulder, said threaded connection portion being adapted for connection in a coolant system, said stem portion of each swivel member having a hardened external surface in confronting relationship to the respective bore wall, said swivel members each having an axial fluid passageway extending therethrough and communicating with said bores, means for establishing a drag friction between each stem portion of the swivel member and the fitting body, said means comprising at least a first, second and third drag friction means including a first external groove in said stem portion and a set screw threadably extending through the respective branch leg substantially radially into said bore and registering with said groove with its inner end bearing against the bottom wall of the said groove to produce a first friction drag, said set screw forcing said stem portion of the swivel member laterally within said bore a sufficient distance to position the outside surface of said stem portion in frictional engagement with the bore wall at a location directly opposite the set screw and with gradually diminishing frictional engagement therewith circumferentially on each side of said location, whereby to provide said second drag friction means, said third drag friction means including a second external groove in said stem portion and a deformable resilient O-ring mounted therein, said second groove having a bottom wall defining a depth with respect to said bore wall less than the cross-sectional diameter of said O-ring thereby compressing said O-ring circumferentially between the bottom of said second groove and said bore wall to produce an O-ring drag friction upon rotation of said stem portion in said bore, said O-ring drag friction being the greatest directly opposite said set screw with a gradual diminishing distribution of the friction on each side thereof; a bonnet threaded into said extension from the said opposite side and having a bore coaxially aligned with the said second bore, the swivel stem portion in the said second bore having a valve seat formation at its inner end about the axial passageway opening therethrough, the bonnet bore having one end portion of its length female-threaded and a second end portion smooth and provided with an O-ring receiving internal groove, a valve stem sealing O-ring in the last said groove, a valve stem member having a male-threaded portion engaged with the female-thread of the bonnet and a smooth portion circumferentially slideably and rotatably sealed to the bonnet by the last said O-ring, said valve stem member having an outer end projecting through said bonnet and provided with a valve operating handle and having an inner end provided with a seat formation adapted to engage against the said seat formation on the said inner end of the swivel stem portion on the said second bore.

References Cited by the Examiner
UNITED STATES PATENTS

| | | | |
|---|---|---|---|
| 1,814,411 | 7/1931 | Russell | 137—615 |
| 2,642,312 | 6/1953 | Shine | 137—355.2 |
| 2,745,682 | 5/1956 | Chevallier | 285—276 |
| 2,819,115 | 1/1958 | Arnold | 285—61 |

OTHER REFERENCES

Pic No Mar Set Screw Bulletin, Pic Design Corp., East Rockaway, N.Y., Van Nuys, Calif., 1964, 4 pp.

M. CARY NELSON, *Primary Examiner.*

W. CLINE, *Assistant Examiner.*